(12) United States Patent
Merlo et al.

(10) Patent No.: US 9,362,626 B2
(45) Date of Patent: Jun. 7, 2016

(54) EQUIPMENT FOR THE REDUCTION OF THE RADAR MARKING FOR AIRCRAFTS

(75) Inventors: Emanuele Merlo, Arona (IT); Fabio Brenna, Moltrasio (IT)

(73) Assignee: ALENIA AERMACCHI SPA, Venegono Superiori (VA) (IT)

( * ) Notice: Subject to any disclaimer, the term of this patent is extended or adjusted under 35 U.S.C. 154(b) by 345 days.

(21) Appl. No.: 13/985,526

(22) PCT Filed: Feb. 13, 2012

(86) PCT No.: PCT/IB2012/000242
§ 371 (c)(1),
(2), (4) Date: Nov. 21, 2013

(87) PCT Pub. No.: WO2012/110873
PCT Pub. Date: Aug. 23, 2012

(65) Prior Publication Data
US 2014/0077987 A1 Mar. 20, 2014

(30) Foreign Application Priority Data
Feb. 14, 2011 (IT) ............................... TO2011A0123

(51) Int. Cl.
*H01Q 17/00* (2006.01)
*B64D 7/00* (2006.01)
*F41H 3/00* (2006.01)
(Continued)

(52) U.S. Cl.
CPC .................. *H01Q 17/00* (2013.01); *B63G 8/34* (2013.01); *B64D 7/00* (2013.01); *F28F 27/00* (2013.01); *F41H 3/00* (2013.01); *F41J 2/00* (2013.01); *F41J 2/02* (2013.01)

(58) Field of Classification Search
CPC ............ H01Q 17/00; B64D 7/00; F41H 3/00; F28F 27/00; B63G 8/34; F41J 2/00; F41J 2/02
USPC ............................................. 342/1–4
See application file for complete search history.

(56) References Cited

U.S. PATENT DOCUMENTS 3,487,410 A * 12/1969 Barnett .................. B64D 33/02
342/2
3,509,568 A * 4/1970 Manning ................ B64D 33/02
219/209

(Continued)

FOREIGN PATENT DOCUMENTS

| EP | 1 520 842 | 4/2005 |
| GB | 2 360 569 | 9/2001 |
| WO | WO 99/17918 | 4/1999 |

OTHER PUBLICATIONS

International Search Report for International Application No. PCT/IB2012/000242 mailed Jul. 13, 2012.

*Primary Examiner* — Peter Bythrow
(74) *Attorney, Agent, or Firm* — Merchant & Gould P.C.

(57) ABSTRACT

Equipment for the reduction of the radar marking of an aircraft V, can be applied to at least one hot portion H of the aircraft, chosen from the following: a piloting cabin or cockpit, including at least one transparent portion; a first frame of the fuselage; a plurality of junction edges of components, including wings, tail veilings and engine air intakes; at least one motor face. Said equipment comprises at least one device for dissipating incident radar waves, which can be removably applied to at least one hot portion H of the aircraft without affecting the aerodynamic characteristics of the aircraft V.

9 Claims, 3 Drawing Sheets

(51) Int. Cl.
*F28F 27/00* (2006.01)
*B63G 8/34* (2006.01)
*F41J 2/00* (2006.01)
*F41J 2/02* (2006.01)

(56) References Cited

U.S. PATENT DOCUMENTS

| | | | | |
|---|---|---|---|---|
| 3,838,425 A | * | 9/1974 | Ishimitsu | B64D 33/02 244/53 B |
| 5,194,985 A | * | 3/1993 | Hilton, Sr. | G02B 27/0006 219/203 |
| 5,250,950 A | * | 10/1993 | Scherrer | H01Q 17/00 342/13 |
| 5,276,447 A | * | 1/1994 | Shingo | F41H 3/00 342/13 |
| 5,358,787 A | * | 10/1994 | Fontana | B32B 7/02 359/359 |
| 5,488,371 A | * | 1/1996 | Targove | H01Q 17/00 342/1 |
| 5,558,919 A | * | 9/1996 | Toni | B29D 24/007 428/116 |
| 5,776,612 A | * | 7/1998 | Fisher | G02B 5/208 359/359 |
| 5,845,877 A | * | 12/1998 | Justice | B64C 9/02 244/131 |
| 6,060,411 A | * | 5/2000 | Cline | B64D 7/00 102/293 |
| 6,399,879 B1 | * | 6/2002 | Ueda | H05K 9/0096 174/389 |
| 6,560,050 B2 | * | 5/2003 | Casteleiro | F41H 3/00 250/353 |
| 6,662,546 B1 | * | 12/2003 | Giffin, III | F02C 7/04 342/4 |
| 6,756,931 B2 | * | 6/2004 | Mukasa | H01Q 17/00 342/1 |
| 6,797,401 B2 | * | 9/2004 | Herron | H01Q 17/004 342/1 |
| 6,909,395 B1 | * | 6/2005 | Carpenter | C03C 8/14 342/1 |
| 7,581,699 B1 | * | 9/2009 | Tafoya | B64C 1/0009 244/119 |
| 8,199,045 B1 | * | 6/2012 | Rodgers | H01Q 17/002 342/1 |
| 2002/0186484 A1 | * | 12/2002 | Casteleiro | F41H 3/00 359/894 |
| 2003/0087048 A1 | * | 5/2003 | Chaussade | B64C 1/1492 428/34 |
| 2004/0257260 A1 | * | 12/2004 | Breeden | H01Q 1/52 342/1 |
| 2005/0170083 A1 | * | 8/2005 | Oguri | B64C 1/1484 427/164 |
| 2006/0012508 A1 | * | 1/2006 | Messano | H01Q 17/00 342/1 |
| 2006/0071126 A1 | * | 4/2006 | Means | B63G 13/02 244/121 |
| 2007/0268173 A1 | * | 11/2007 | Randy | F41H 3/00 342/2 |
| 2010/0271253 A1 | * | 10/2010 | Shah | H01B 1/18 342/2 |

* cited by examiner

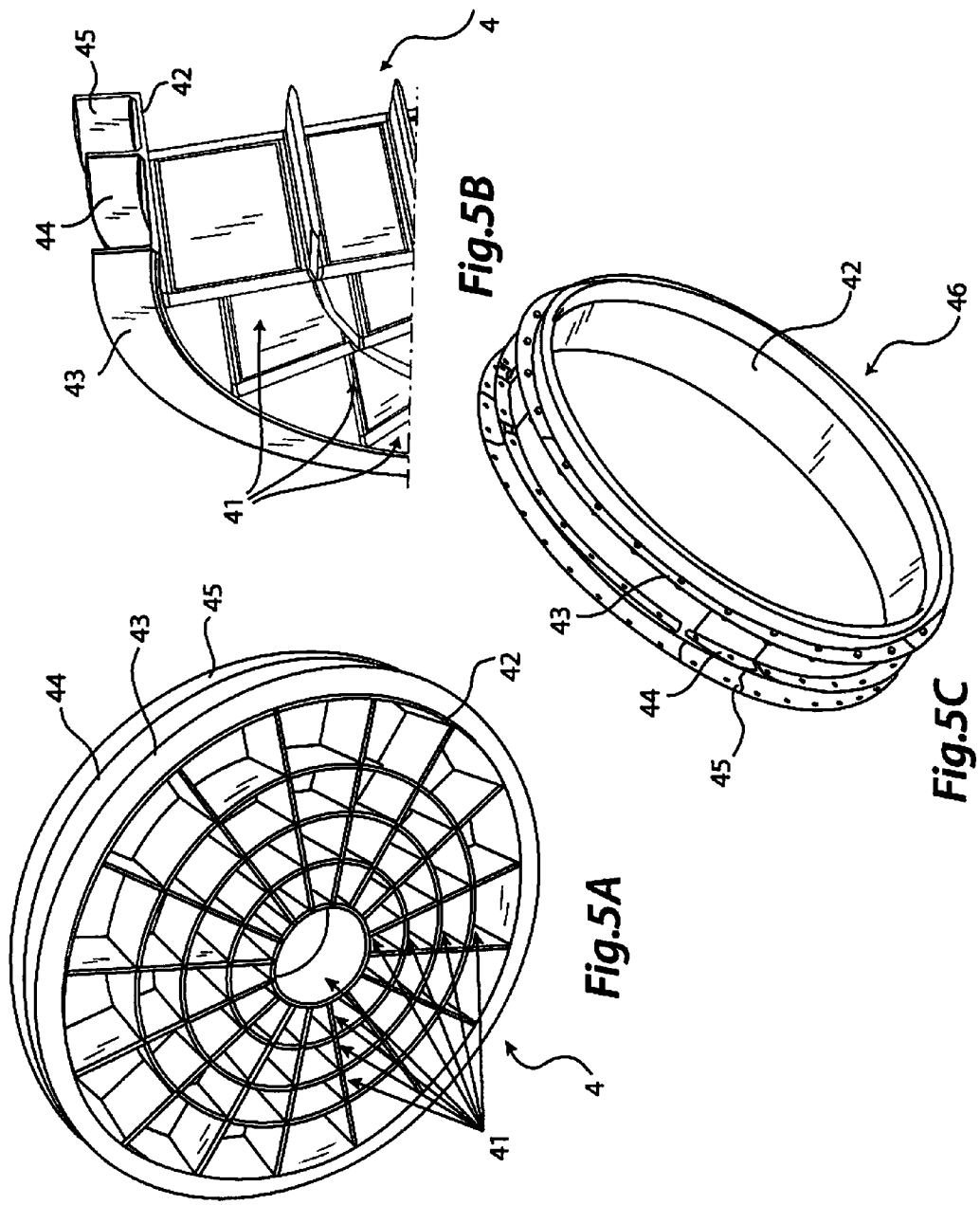

_US 9,362,626 B2_

EQUIPMENT FOR THE REDUCTION OF THE RADAR MARKING FOR AIRCRAFTS

This application is a National Stage Application of PCT/IB2012/000242, filed 13 Feb. 2012, which claims benefit of Serial No. TO2011A000123, filed 14 Feb. 2011 in Italy and which applications are incorporated herein by reference. To the extent appropriate, a claim of priority is made to each of the above disclosed applications.

BACKGROUND

The present invention relates to equipment for the reduction of the radar marking of portions of an aircraft which are mostly detectable by radar systems, which portions are conventionally called "hot spots", or "hot" portions.

Said equipment is only positioned on said hot portions when necessary, and is removed as soon as it is no longer needed.

Systems are known for reducing radar marking, which are typically applied to military aircraft and which are based on two production techniques:
  designing the aircraft with geometries specifically conceived to make the aircraft itself less visible to radar systems, along with the definitive integration of materials or paints capable of absorbing incident radar radiation;
  converting an existing aircraft by providing it with anti-detection structures, which are typically permanently secured to the aircraft structure.

The former solution concerns aircraft like those, for example, of the type known as "stealth", which are fitted with a very sophisticated structure specially designed for this purpose, i.e. for being invisible to radar systems.

The shape and structure of stealth aircraft considerably reduce the reflection of irradiated electromagnetic waves towards the observation point, thus making the aircraft substantially invisible to radar systems.

Furthermore, such aircraft are completely painted with absorbing paints that absorb incident electromagnetic waves, thereby making the aircraft substantially invisible to radar systems.

Manufacturing this solution is costly, because the aircraft needs a very complex structure; in addition, this solution also requires very costly maintenance, because the absorbing paint remains exposed to atmospheric agents and deteriorates quickly.

Moreover, these types of paints are very expensive, leading to considerable costs.

The second solution is applied to fighter aircraft, the structure of which is specially designed for better aerodynamics and handling, but can be easily detected by radar systems.

The structure of such aircraft is less complex and less costly to produce than that of stealth type aircraft.

The second solution mentioned above equips such aircraft with permanent means that allow making the aircraft hardly detectable by radar systems, even though such means do not always ensure optimal results.

For example, fighter aircraft are coated with absorbing paints or are fitted with fixed coatings which become a permanent part of the aircraft itself.

This solution is disadvantageous in that the aircraft are subjected to definitive modifications which are costly both in terms of initial investment, since they often require in-depth re-design and integration activities, and of maintenance, since such means always remain exposed to weather and external agents, thus raising the aforementioned problems.

Implementing the second solution also raises problems due to the construction complexity of said means for reducing visibility to radar systems and to the adoption of permanent means that modify the original configuration of the aircraft.

The application of said means to the aircraft normally requires long dead times.

SUMMARY

The present invention relates to removable equipment for radar marking reduction, to be applied to hot portions of an aircraft.

Said equipment can be implemented to any existing type of aircraft, by applying onto the hot portions of the aircraft devices that reduce visibility to radar systems.

Said equipment can be removed from the aircraft when invisibility to radar systems is no longer required, resulting in lower installation and maintenance costs; furthermore, it allows for shorter dead times of the aircraft needing installation or removal of said equipment, thus making the aircraft quickly available again in the fleet.

One aspect of the present invention relates to equipment for the reduction of the radar marking of an aircraft.

BRIEF DESCRIPTION OF THE DRAWINGS

The features and advantages of said equipment will become more apparent from the following description of an embodiment thereof with reference to the annexed drawings, wherein:

FIGS. 5A, 5B and 5C show the grid adapted to make the motor face invisible to radar systems in accordance with the present invention; in particular, FIG. 5A shows a perspective view of the grid, FIG. 5B shows a detail of the cross-section of a grid according to the present invention, and FIG. 5C shows the replacement structure to be fitted as a substitute for said grid when the latter is removed.

DETAILED DESCRIPTION

With reference to the above-listed drawings, the equipment for radar marking reduction can be installed on an aircraft V by applying it to at least one hot portion H of the aircraft itself, which can be easily detected by radar systems.

Said equipment comprises at least one device for dissipating incident radar waves, which can be applied and subsequently removed as necessary without affecting the aerodynamic characteristics of aircraft V.

For the purposes of the present description, a hot portion H of the aircraft is any portion which can normally be detected by a radar system, such as, for example: a piloting cabin or cockpit, comprising at least one transparent portion, such as the cabin roof; a first frame of the fuselage, to which the radar antenna of the aircraft is constrained, and which is visible to radar through a radome transparent to radiation; a plurality of junction edges of components such as wings, engine air intakes, tail veilings, and at least one motor face.

Said equipment includes at least one device implementing a peculiar or respective technical solution for each hot portion of aircraft V for the purpose of reducing radar marking.

According to the present invention, in order to reduce the radar marking coming from hot portions H of the aircraft such as a piloting cabin or cockpit, which includes at least one transparent portion, the equipment comprises at least one metallization 1, which is applied onto said transparent portions.

Said metallization 1 is adapted to restore an electric continuity of aircraft V, so as to reduce the generation of diffractions of the incident wave inside the cockpit coated with said metallization, which diffractions can be potentially picked up by the radar system; in addition, it ensures reflections in directions outside the coverage of the radar system.

Metallization 1 is obtained by applying a plurality of coating layers, preferably three layers.

Figure 1A:
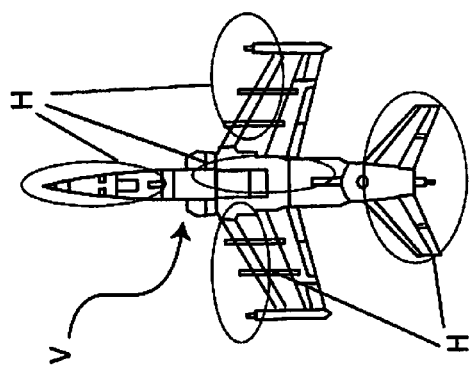
FIGS. 1A, 1B and 1C show different projection views of an aircraft, wherein those hot portions are highlighted which are typically most significant and which can be made invisible to radar systems through the equipment according to the present invention.
Figure 1B:
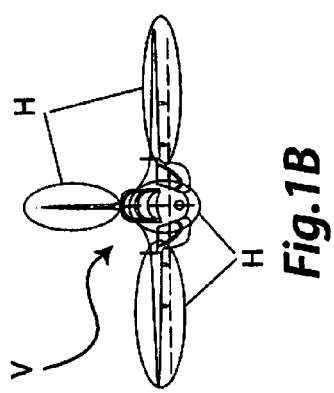
Figure 1C:
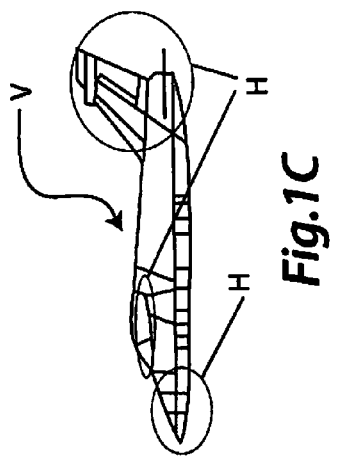
Figure 2:
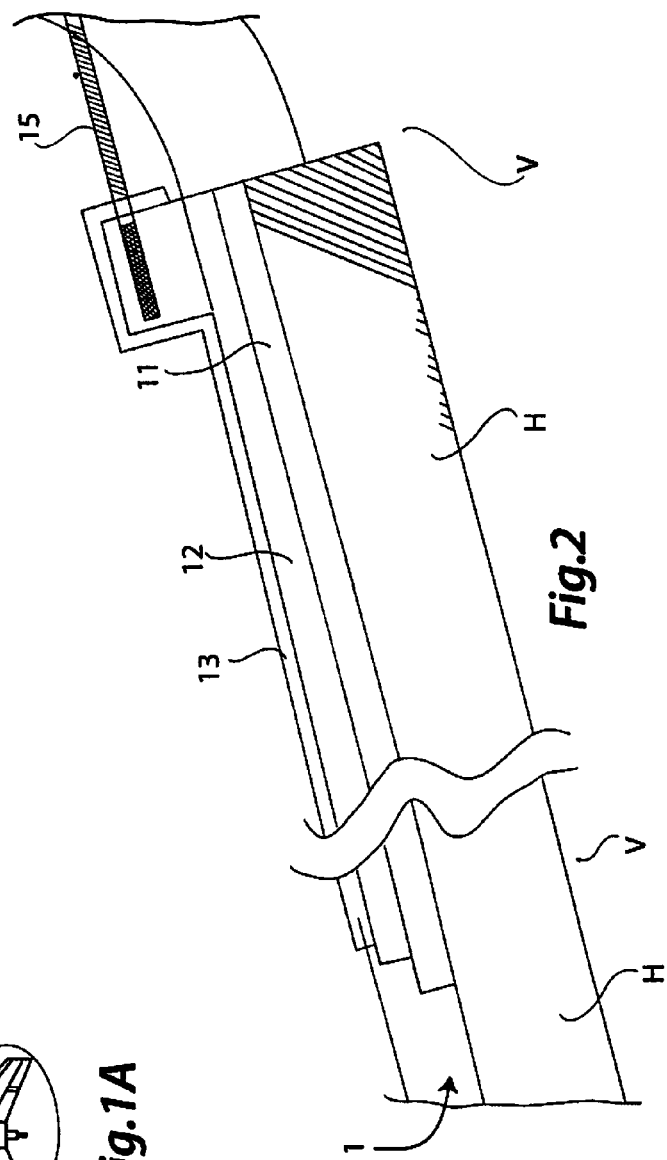
FIG. 2 shows a sectional view of a metallization applied to the transparent surfaces of the aircraft according to the present invention.

In the embodiment show in FIG. 2, said metallization 1 comprises at least one first layer or base 11, which is adapted to prepare the transparent portion to receive metallization 1.

Said first layer 11 is followed by at least one second layer 12, which is preferably applied by depositing material having high electric conductivity, such as, for example, gold or equivalent materials that can be easily worked on the surface. Said second layer 12, which is the actual metallizing conductive layer, is laid over the first layer 11 by using material atomization methods.

In order to protect metallization 1, at least one protective coating 13 is also laid, which is adapted to minimize the risk of damage to metallization 1 caused by accidental shocks or atmospheric agents.

In addition to the above-mentioned plurality of layers, metallization 1 also comprises a plurality of electric devices adapted to provide an electric connection between metallization 1 and the structure of aircraft V.

In the embodiment shown in FIG. 2, said electric devices comprise at least one junction device 15, preferably consisting of a conductive foil, e.g. made of silver, in electric contact with the second layer 12.

Said junction device 15 is adapted to connect the layers comprised in metallization 1 to the structure of aircraft V.

Said metallization 1 can be applied while manufacturing the transparent portions of the cockpit, which can be replaced as a whole.

When the equipment of the present invention is no longer needed, it will suffice to replace said transparent portions of the cockpit with transparent portions lacking metallization 1.

According to the present invention, in order to reduce the radar marking coming from hot portions H of the aircraft such as, for example, at least one junction edge of components such as wings, tail veilings and engine air intakes, the equipment comprises at least one coating, portion 2 which is positioned on the front edge of said components of aircraft V without affecting the aerodynamic profile of the component itself.

Figure 3B:
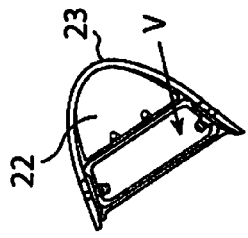
FIGS. 3A and 3B show the coating portion adapted to make the junction edges of an aircraft invisible to radar systems in accordance with the present invention, FIG. 3A showing a perspective sectional view and FIG. 3B showing a lateral cross-section of the coating portion, respectively.
Figure 3A:
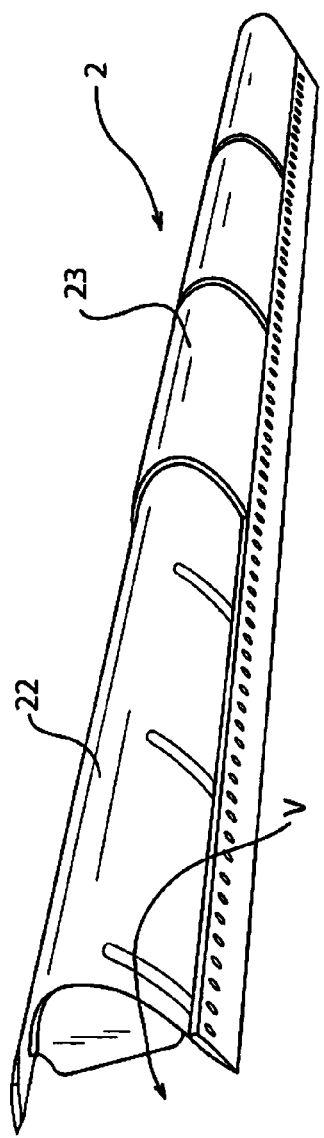

In the embodiment shown in FIGS. 3A, 3B, said coating portion 2 comprises a first support structure 22, preferably made of metal material, which is secured to the structure of the component of aircraft V through fastening means such as screws or bolts.

A second radar-absorbing coating 23 is then secured over said first structure 22, which is adapted to absorb incident electromagnetic waves, thus significantly attenuating any reflected and/or diffracted waves.

When said coating portion 2 is no longer needed, it can be removed from the structure of aircraft V and possibly replaced with a coating portion that provides the required aerodynamic profile by appropriately shaping structure 22, now lacking the second radar-absorbing coating 23.

This solution allows to keep unchanged the required aerodynamic profile of said junction edges, thereby reducing installation costs and complexity.

According to the present invention, in order to reduce the radar marking coming from a hot portion H of an aircraft such as the first frame of the fuselage, the equipment comprises at least one sheet of adhesive metal material 31, e.g. aluminium, which covers the first frame of the fuselage of aircraft V, and at least one layer of absorbing material 32 fixed to said sheets of metal material 31.

Figure 4B:
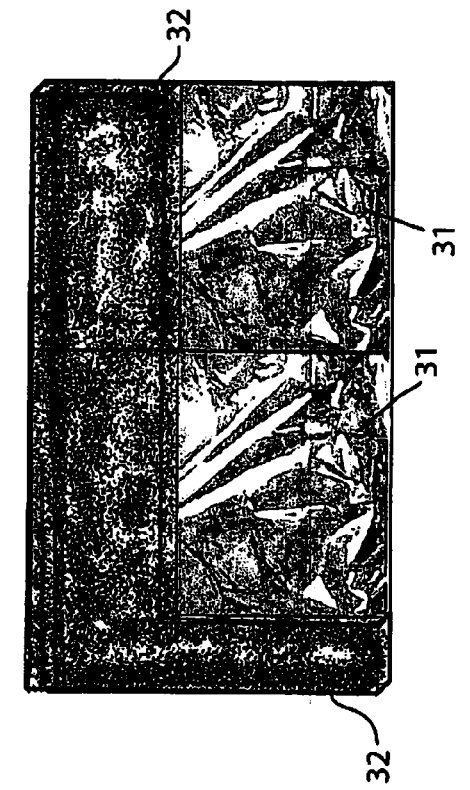
FIGS. 4A and 4B illustrate the equipment for the first frame of the fuselage, FIG. 4A showing the position of the equipment and FIG. 4B showing a front sectional view of a coating portion used for making the first frame of the fuselage of the aircraft invisible to radar systems in accordance with the present invention.
Figure 4A:
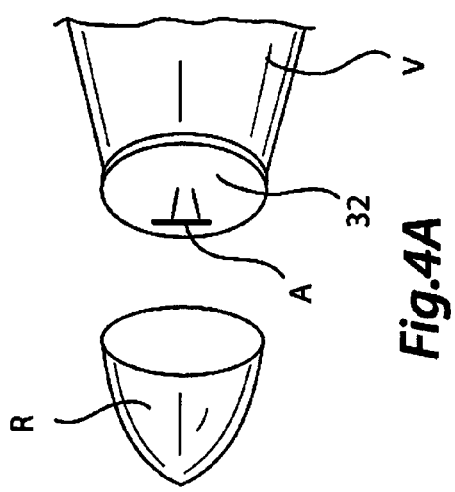

As shown in FIG. 4A, the equipment is positioned between the first frame of the fuselage and radar antenna A, which in turn is covered by radome R.

When viewed from the front, the shape of the sheets of metal material 31 and of absorbing material 32 is such as to correspond to the shape of the first frame of the fuselage of aircraft V.

As shown in FIG. 4B, absorbing material 32 is secured, e.g. by gluing, to the sheets of metal material 31.

Absorbing material 32 employed is, for example, a sponge layer imbibed with ferrite or graphite powder or the like, which can absorb incident electromagnetic waves, thus considerably attenuating the reflected wave.

When the function of the equipment for reducing the marking of the first frame of the fuselage of aircraft V is no longer needed, one can directly intervene by removing the sheets of metal material 31, to which layers 32 are secured, in order to restore the first frame of the fuselage to its original state.

This solution reduces the costs and weight of the equipment to be fixed to aircraft V, as well as installation complexity.

According to the present invention, in order to reduce the radar marking coming from hot portions of the aircraft such as at least one motor face, the equipment comprises at least one grid 4 adapted to allow an air flow to come in towards the engine and to make the motor face of aircraft V less visible to the radar system.

In the embodiment shown in FIGS. 5A and 5B, grid 4 comprises an inner structure with a plurality of openings 41, which are so sized as to behave like a flat surface for the lower frequencies of the frequency spectrum commonly used by low-frequency radar recognition systems, such as, for example, Jet Engine Modulation, thereby preventing the generation of diffracted waves, which are potentially recognizable by the radar system.

The inner surface of said openings 41 is coated with thin radar-absorbing material adapted to absorb electromagnetic waves at higher frequencies, e.g. within the 10 GHz X-band.

The combined use of appropriately sized openings 41 and absorbing material makes this component of the aircraft unlikely to be detected by radar systems.

Preferably, said grid 4 has a circular shape similar to the cross-section of the structure of the engine compartment or gondola.

In the embodiment shown in FIGS. 5A, 5B, grid 4 comprises a support structure 42 comprising a plurality of rings, which is adapted to secure said grid 4 to aircraft V through fastening means, such as screws and bolts.

In the detail of FIG. 5B, support structure 42 comprises a first ring 43, to be structurally constrained to the conduit of the engine or gondola air intake, a second ring 44, to be constrained to a firewall included in the engine compartment, and a third ring 45, adapted to stop the engine interface gasket.

When said grid 4 is no longer required, it can be extracted from the structure of the engine compartment or gondola and may possibly be replaced, to preserve conduit continuity, with a substitutive structure 46, which essentially has the same external shape as the support structure of grid 4 and lacks the inner structure thereof.

This solution reduces the costs and time required for applying said equipment to aircraft V.

In addition to offering advantages in the manufacturing stage, the equipment according to the present invention is also economically advantageous as far as maintenance is concerned, because it is only used when actually required and hence is less subject to wear.

The equipment only acts upon the most important hot portions, avoiding wasting resources for making hardly detectable by radar systems portions of aircraft V which already are per se unlikely to be detected, thus considerably reducing the cost of the equipment itself.

The choice of only acting upon the most detectable areas represents an optimum point between the costs of the interventions and the effectiveness that can be attained.

The present equipment can be easily installed on existing aircraft V already in use; therefore, said equipment can be easily installed and subsequently removed to restore the aircraft to its original condition.

Said equipment is preferably applied to all of the aforementioned hot portions H of the aircraft, but it may nonetheless be applied only to some of said portions H, while keeping other portions in the initial configuration.

The choice of hot portions H to which the equipment according to the present invention must be applied depends on the characteristics of aircraft V and on specific use requirements.

The invention claimed is:

1. Equipment for reduction of radar marking of an aircraft, which can be applied to at least one hot portion of the aircraft chosen from the following:
    a piloting cabin or cockpit, comprising at least one transparent portion;
    a first frame of the fuselage;
    a plurality of junction edges of components, including wings, tail veilings and engine air intakes;
    at least one motor face;
    said equipment comprising:
        at least one removable device for dissipating incident radar waves, which is applied to at least one hot portion of the aircraft without affecting aerodynamic characteristics of the aircraft;
        at least one grid to reduce the radar marking from hot portions of the aircraft including at least one motor face; the grid comprising:
            an inner structure with a plurality of openings;
            a support structure for securing the grid to the aircraft;
            wherein said openings are sized to act like a flat surface for lower frequencies of a frequency spectrum commonly used by low-frequency radar recognition systems;
            each of said openings comprising an inner surface coated with a thin radar absorbing material adapted to absorb electromagnetic waves at high frequency;
            said grid being adapted to allow air flow to the engine and to reduce visibility of the motor face of the aircraft to radar systems.

2. The equipment according to claim 1, wherein, in order to reduce the radar marking from hot portions of the aircraft including the piloting cabin or cockpit, which comprise at least one transparent portion, said equipment comprises a metallization applied to said transparent portions.

3. The equipment according to claim 2, wherein the metallization is obtained by applying a plurality of coating layers onto the transparent portion of the piloting cabin, comprising: at least one first layer or base, for preparing the transparent portion to receive the metallization; at least one second layer, which is the a metallizing conductive layer.

4. The equipment according to claim 1, wherein, in order to reduce the radar marking from hot portions of the aircraft including at least one junction edge of components including wings, tail veilings and engine air intakes, the equipment comprises at least one coating portion, which is positioned on a front edge of the components of the aircraft without affecting the aerodynamic profile thereof.

5. The equipment according to claim 4, wherein said coating portion comprises: a first structure of metal material, fixed to structure of the component of the aircraft; a second radar-absorbing coating, laid over said first structure for absorbing incident electromagnetic waves.

6. The equipment according to claim 1, wherein, in order to reduce the radar marking from a hot portion of the aircraft including the first frame of the fuselage, the equipment comprises: at least one sheet of adhesive metal material, which covers the first frame of the fuselage of the aircraft; at least one layer of absorbing material, fixed to said sheets of metal material.

7. The equipment according to claim 3, wherein said metallization comprises a plurality of electric devices adapted to ensure electric connection between the metallization and the structure of the aircraft.

8. The equipment according to claim 1, wherein said grid has a circular shape similar to a cross-section of a structure of the engine compartment.

9. The equipment according to claim 8, further comprising a substitutive structure, which has substantially the same shape as the support structure of the grid and is interchangeable with the support structure of the grid to preserve conduit continuity.

* * * * *